(12) United States Patent
Dai et al.

(10) Patent No.: US 12,379,009 B2
(45) Date of Patent: Aug. 5, 2025

(54) TRIBOELECTRIC GENERATION APPARATUS BASED ON FRICTION BRAKE, AND FRICTION BRAKE

(71) Applicant: Tencent Technology (Shenzhen) Company Limited, Guangdong (CN)

(72) Inventors: Yuan Dai, Shenzhen (CN); Jiahua Wang, Shenzhen (CN); Jie Lai, Shenzhen (CN); Zhengyou Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 399 days.

(21) Appl. No.: 17/899,249

(22) Filed: Aug. 30, 2022

(65) Prior Publication Data

US 2022/0412418 A1    Dec. 29, 2022

Related U.S. Application Data

(63) Continuation of application No. PCT/CN2021/100551, filed on Jun. 17, 2021.

(30) Foreign Application Priority Data

Jun. 17, 2020    (CN) .......................... 202010553081.3

(51) Int. Cl.
*F16D 65/18*    (2006.01)
*F16D 65/10*    (2006.01)
(Continued)

(52) U.S. Cl.
CPC .............. *F16D 65/18* (2013.01); *F16D 65/10* (2013.01); *F16D 65/127* (2013.01); *F16D 65/22* (2013.01); *H02N 1/04* (2013.01); *F16D 2121/18* (2013.01)

(58) Field of Classification Search
CPC .......... F16D 65/18; F16D 65/10; F16D 65/22; F16D 65/123–127; F16D 2121/18; H02N 1/04
(Continued)

(56) References Cited

U.S. PATENT DOCUMENTS 8,648,484 B2    2/2014    Abe et al.

FOREIGN PATENT DOCUMENTS

CN    102474156 A    5/2012
CN    103795288 A    5/2014
(Continued)

OTHER PUBLICATIONS

Office Action and search report for corresponding Chinese application No. 202010553081.3 dated Jan. 31, 2023, 7p, in Chinese language.

(Continued)

*Primary Examiner* — Christopher P Schwartz
(74) *Attorney, Agent, or Firm* — Crowell & Moring LLP

(57) ABSTRACT

A triboelectric generation apparatus based on a friction brake and a friction brake provide a simple structure with high reliability, a stable circuit, and high energy recovery efficiency. The triboelectric generation apparatus includes two sensing electrodes arranged in a first friction component of the friction brake. When the first friction component is in frictional contact with a second friction component, induced electric charges are generated on the two sensing electrodes. The induced electric charges are different. An electric charge collection circuit is connected to the sensing electrodes and is configured to store the induced electric charges. Storing the induced electric charges allows for the recovery of energy using a simple structure with high reliability.

20 Claims, 13 Drawing Sheets

(51) Int. Cl.
*F16D 65/12* (2006.01)
*F16D 65/22* (2006.01)
*H02N 1/04* (2006.01)
*F16D 121/18* (2012.01)

(58) Field of Classification Search
USPC ............... 188/156–164, 218 XL; 290/45
See application file for complete search history.

(56) References Cited

FOREIGN PATENT DOCUMENTS

| | | | | |
|---|---|---|---|---|
| CN | 104682766 A | | 6/2015 | |
| CN | 105811799 A | | 7/2016 | |
| CN | 108131405 A | * | 6/2018 | ............... B60L 7/10 |
| CN | 110995053 A | | 4/2020 | |
| CN | 111692250 A | | 9/2020 | |
| DE | 10 2015 006 663 A1 | | 11/2016 | |
| EP | 3 609 071 A1 | | 2/2020 | |
| KR | 20220049996 A | * | 4/2022 | ............. F16D 66/02 |
| WO | WO 2014/169673 A1 | | 10/2014 | |

OTHER PUBLICATIONS

Concise Explanation of Relevance for B3.
Extended European Search Report for corresponding application No. EP 21825198.1 dated Jun. 26, 2023, 7p.
International Search Report and Written Opinion for priority application No. PCT/CN2021/100551 dated Sep. 24, 2021, 10p, in Chinese language.
English language translation of International Search Report for priority application No. PCT/CN2021/100551 dated Sep. 24, 2021, 2p.

* cited by examiner

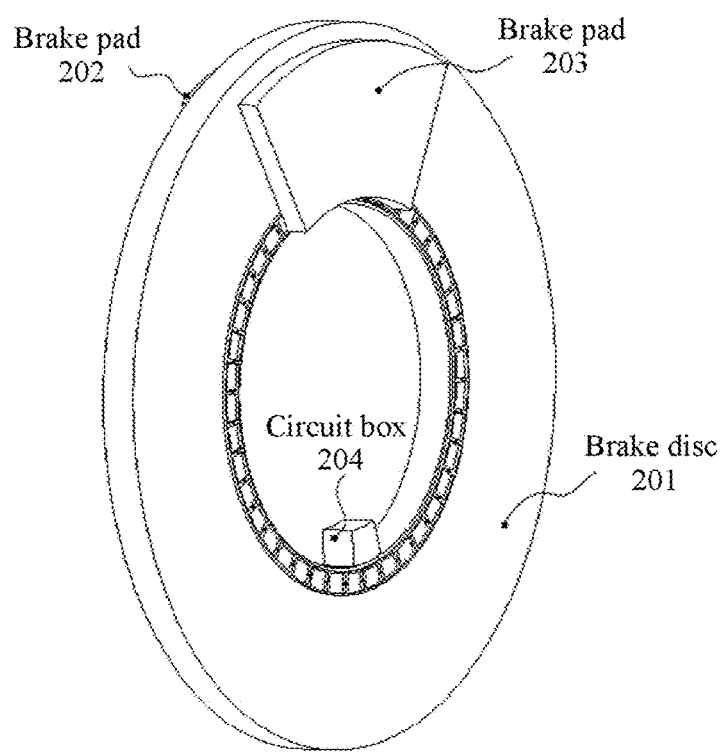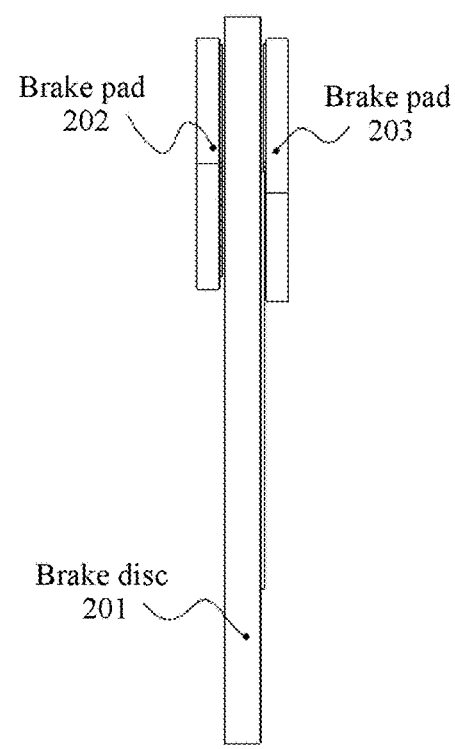
FIG. 3a
FIG. 3b

TRIBOELECTRIC GENERATION APPARATUS BASED ON FRICTION BRAKE, AND FRICTION BRAKE

RELATED APPLICATION

This application claims priority to PCT/CN2021/100551 filed on Jun. 17, 2021, published as WO2021/254425A1, entitled "FRICTION POWER GENERATION DEVICE BASED ON FRICTION BRAKE, AND FRICTION BRAKE," which claims priority to Chinese Patent Application No. 202010553081.3, entitled "TRIBOELECTRIC GENERATION APPARATUS BASED ON FRICTION BRAKE AND FRICTION BRAKE" filed on Jun. 17, 2020, each of which are incorporated herein by reference in their entirety.

FIELD OF THE TECHNOLOGY

This application relates to the field of triboelectric generation technologies, and more specifically, to a triboelectric generation technology based on a friction brake.

BACKGROUND OF THE DISCLOSURE

A braking process is a process that can decelerate or stop a moving object, and widely exists in the fields of vehicle transportation, hoisting machinery, and construction machinery. The braking process can usually be implemented by using a brake. A friction brake brakes a moving object through frictional resistance, and has the advantages of a simple structure and low costs. However, using the friction brake as an example, the braking process often consumes a large amount of energy, which is mainly dissipated in the form of frictional heat, resulting in a large amount of energy waste.

At present, energy recovery solutions based on a braking process mainly include: (1) driving, through relative motion between brake components, rotation of an electromagnetic generator, thereby generating electric energy; (2) converting motion of an object into hydraulic potential energy in a hydraulic apparatus to store energy; (3) using heat generated by friction between brake components to generate electricity using a thermoelectric reaction; (4) in new energy vehicles, directly reversing a motor to use as a generator, and using a battery as a load to charge the battery, thereby decelerating and recovering energy; and (5) using a triboelectric nanogenerator to recover energy.

However, existing energy recovery solutions have low efficiency, complex structures, high maintenance costs, and low reliability, and do not fully consider the structural characteristics of the brake and circuit characteristics, such as the high impedance, of the energy recovery apparatus. The structural design of the energy recovery apparatus, the electrode accuracy and controllability of the energy recovery circuit, and the like may be optimized and improved.

SUMMARY

An embodiment of this application provides a triboelectric generation apparatus based on a friction brake, the friction brake including a first friction component and a second friction component arranged opposite to each other, the first friction component generating a friction braking force and generating an electric charge in response to generating contact friction relative to the second friction component, the triboelectric generation apparatus including: a first sensing electrode and a second sensing electrode arranged in the first friction component, when the first friction component generates contact friction relative to the second friction component, a first induced electric charge being generated on the first sensing electrode, and a second induced electric charge being generated on the second sensing electrode, the first induced electric charge being different from the second induced electric charge; and an electric charge collection circuit, connected to the first sensing electrode and the second sensing electrode respectively, and configured to store the electric charges collected from the first sensing electrode and the second sensing electrode.

In some embodiments, a friction plate is arranged on an inner side of the second friction component, the inner side of the second friction component being a side of the second friction component opposite to the first friction component, a friction material of the first friction component having a first electric polarity, and a friction material of the friction plate on the second friction component having a second electric polarity, the first electric polarity being opposite to the second electric polarity.

In some embodiments, the triboelectric generation apparatus further includes: a reed switch arranged in the second friction component, the electric charge collection circuit storing the electric charges collected from the first sensing electrode and the second sensing electrode under the control of the reed switch.

In some embodiments, the triboelectric generation apparatus further includes: a first switch electrode and a second switch electrode arranged in the first friction component, the electric charge collection circuit including: a rectifier circuit, a first input terminal thereof being connected to the first sensing electrode, a second input terminal thereof being connected to the second sensing electrode, and a first output terminal thereof being connected to the first switch electrode; and an electric charge storage circuit, a first input terminal thereof being connected to the second switch electrode, and a second input terminal thereof being connected to a second output terminal of the rectifier circuit, the reed switch being configured to control a connection between the first switch electrode and the second switch electrode, when the first switch electrode is connected to the second switch electrode by the reed switch, the electric charge storage circuit storing the electric charges collected from the first sensing electrode and the second sensing electrode.

In some embodiments, the first friction component is a disc ring, the first sensing electrode being an annular outer comb-shaped sensing electrode, and the second sensing electrode being an annular inner comb-shaped sensing electrode, comb teeth of the outer comb-shaped sensing electrode and comb teeth of the inner comb-shaped sensing electrode being arranged crosswise, and there being a first gap between the outer comb-shaped sensing electrode and the inner comb-shaped sensing electrode.

In some embodiments, the first switch electrode and the second switch electrode are arranged on an inner circle or an outer circle of the ring of the first friction component, the first switch electrode is an annular outer comb-shaped switch electrode, and the second switch electrode is an annular inner comb-shaped switch electrode; or the first switch electrode is the annular inner comb-shaped switch electrode, the second switch electrode is the annular outer comb-shaped switch electrode; and both a quantity of comb teeth of the outer comb-shaped switch electrode and a quantity of comb teeth of the inner comb-shaped switch electrode are a first quantity, and the comb teeth of the outer comb-shaped switch electrode and the comb teeth of the inner comb-shaped switch electrode are arranged opposite to form a first quantity of comb tooth pairs, and there is a second gap between oppositely arranged comb teeth in each comb tooth pair, the reed switch being configured to control a mechanical connection between the outer comb-shaped switch electrode and the inner comb-shaped switch electrode.

In some embodiments, both a quantity of the comb teeth of the outer comb-shaped sensing electrode and a quantity of the comb teeth of the inner comb-shaped sensing electrode are a second quantity, and the first quantity is two times the second quantity, the outer comb-shaped sensing electrode and the inner comb-shaped sensing electrode having a same comb tooth width and a same radial length respectively, and the first quantity of comb tooth pairs having a one-to-one correspondence with the comb teeth of the outer comb-shaped sensing electrode and the comb teeth of the inner comb-shaped sensing electrode.

In some embodiments, the comb tooth pairs of the outer comb-shaped switch electrode and the inner comb-shaped switch electrode are located on edges of the comb teeth of the outer comb-shaped sensing electrode and the comb teeth of the inner comb-shaped sensing electrode in a radial direction; and the reed switch is located on an edge of the second friction component in a radial direction, and is arranged parallel to the second gap, a radial width of the reed switch being greater than a width of the second gap, to cause the outer comb-shaped switch electrode and the inner comb-shaped switch electrode to switch on when the reed switch is in contact with the outer comb-shaped switch electrode and the inner comb-shaped switch electrode.

In some embodiments, the second friction component is a partial ring sheet, a friction plate being arranged on an inner side of the second friction component, the inner side of the second friction component being a side of the second friction component opposite to the first friction component, and the first friction component rotates around a center of the ring, to generate contact friction with the friction plate on the second friction component, a friction material of the first friction component having a first electric polarity, and a friction material of the friction plate on the second friction component having a second electric polarity, the first electric polarity being opposite to the second electric polarity; the friction plate includes a plurality of annular grid plates, each annular grid plate in the plurality of annular grid plates being radially arranged in an annular region corresponding to a region in which the comb teeth of the outer comb-shaped sensing electrode intersect the comb teeth of the inner comb-shaped sensing electrode; the each annular grid plate in the plurality of annular grid plates has a comb tooth shape the same as that of the outer comb-shaped sensing electrode or the inner comb-shaped sensing electrode; and there is a third gap between adjacent annular grid plates in the plurality of annular grid plates, the third gap having a width the same as that of a gap between adjacent comb teeth of the outer comb-shaped sensing electrode or a gap between adjacent comb teeth of the inner comb-shaped sensing electrode.

In some embodiments, the first friction component is provided with an opening at a position corresponding to the first gap, and the second friction component is provided with an opening at a position corresponding to the third gap.

In some embodiments, the outer comb-shaped sensing electrode and the inner comb-shaped sensing electrode are made of copper, nickel, gold, silver, aluminum, or iron.

Another embodiment provides a friction brake, including: a brake disc and a brake pad arranged opposite to each other, the brake disc generating a friction braking force and generating an electric charge in response to generating contact friction relative to the brake pad; and the brake further including a triboelectric generation apparatus, the triboelectric generation apparatus including: a first sensing electrode and a second sensing electrode arranged in the brake disc, when the brake disc generates contact friction relative to the brake pad, a first induced electric charge being generated on the first sensing electrode, and a second induced electric charge being generated on the second sensing electrode, the first induced electric charge being different from the second induced electric charge; and an electric charge collection circuit, connected to the first sensing electrode and the second sensing electrode respectively, and configured to store the electric charges collected from the first sensing electrode and the second sensing electrode.

In some embodiments, a friction plate is arranged on an inner side of the brake pad, the inner side of the brake pad being a side of the brake pad opposite to the brake disc, a friction material of the brake disc having a first electric polarity, and a friction material of the friction plate on the brake pad having a second electric polarity, the first electric polarity being opposite to the second electric polarity.

In some embodiments, the friction brake is a disc brake, the brake disc being a disc ring, the brake pad being a partial annular sheet, the brake disc and the brake pad being coaxial, and the brake pad being located on one or both sides of the brake disc.

In some embodiments, the friction brake is a drum brake, the brake disc being an annular cylinder, the brake pad being a partial annular cylinder, the brake disc and the brake pad being coaxial, and the brake pad being located on an inner side of the brake disc.

The embodiments of this application provide a triboelectric generation apparatus based on a friction brake, and a friction brake. The triboelectric generation apparatus takes the structure of the friction brake into full consideration. When a first friction component constituting the friction brake generates contact friction relative to a second friction component, a first induced electric charge is generated on a first sensing electrode, a second induced electric charge is generated on a second sensing electrode, and an electric charge collection circuit is used to connect to the first sensing electrode and the second sensing electrode, to store the electric charges collected from the first sensing electrode and the second sensing electrode, thereby implementing collection for triboelectric generation. The apparatus combines a triboelectric nanogenerator with a friction brake, which simplifies the structure and improves the reliability; uses a synchronous electric charge extraction circuit to decouple the impedance of the triboelectric nanogenerator and a load circuit, and improve the performance of the circuit under different loads; and integrates a ladder-shaped mechanical contact switch on the brake to improve the stability and precision of a circuit switch.

BRIEF DESCRIPTION OF THE DRAWINGS

To describe the technical solutions in the embodiments more clearly, the following briefly describes the accompanying drawings required for describing the embodiments of this application. The accompanying drawings in the following description show merely some embodiments of this application, and a person of ordinary skill in the art may

FIG. 3a and FIG. 3b respectively show a three-dimensional view and a side view of an example triboelectric generation apparatus based on a disc brake according to an embodiment of this application in a braking state.

DESCRIPTION OF EMBODIMENTS

Figure 1:
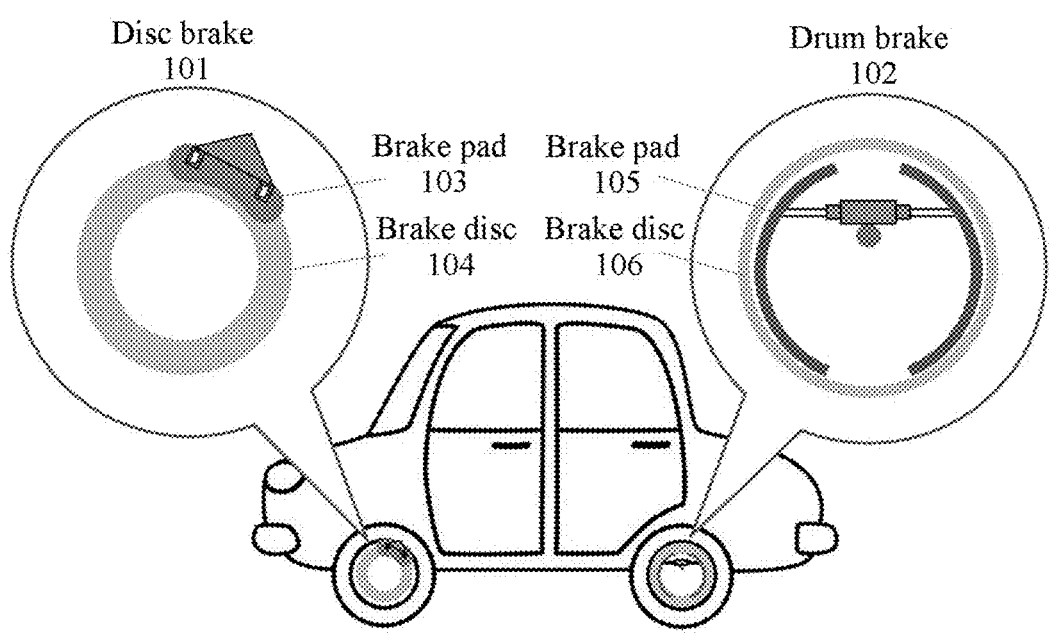
FIG. 1 shows a schematic diagram of two typical friction brakes in an automobile.

The objectives, technical solutions, and advantages of this application are described in further detail below with reference to the accompanying drawings. The described embodiments are merely some of the embodiments within the scope of this application. It is to be understood that, this application is not limited by the example embodiments described herein.

In the following description and the accompanying drawings, steps and elements that are substantially the same or similar are indicated by the same or similar reference signs, and repeated descriptions of such steps and elements may be omitted. In addition, in the descriptions of this application, the terms such as "first" and "second" are intended to distinguish for purposes of the descriptions only, and are not to be understood as indicating or implying relative importance or a sequence.

In this description and the accompanying drawings of this application, elements are described in the singular or plural form according to some embodiments. However, the singular and plural forms are appropriately selected to be used in the described circumstances merely for ease of interpretation and are not intended to limit this application. Therefore, the singular form includes the plural form, and the plural form also includes the singular form, unless the context clearly indicates otherwise.

A triboelectric nanogenerator (TENG) generates movement of an electric charge through frictional motion between different materials based on the principles of triboelectric charging and electrostatic induction, to collect and utilize the electric charge, which is a process of converting mechanical energy into electric energy.

A self-powered synchronous electric charge extraction (SECE) circuit includes devices such as bridges, switches, and inductors, and when an output voltage of the generator reaches the maximum, switches on the switches synchronously to extract all electric charges.

A brake is an apparatus with functions such as decelerating or stopping a moving object or maintaining a stop state. The brake usually achieves the objective of braking and deceleration through contact friction between a brake disc and a brake pad.

A brake pad is one of the components in the brake. A component in the brake that has a relatively small contact surface and that comes into contact with the brake disc under the driving and control of the system to generate contact friction is referred to as a brake pad, for example, a brake pad in a drum brake of an automobile.

A brake disc is another important component in the brake that has a relatively large contact surface and that usually moves with the moving object, for example, a brake drum in a drum brake of an automobile.

A braking process is a process that can decelerate or stop a moving object, and widely exists in the fields of vehicle transportation, hoisting machinery, and construction machinery. The braking process can usually be implemented by using a brake. A friction brake brakes a moving object through frictional resistance, and has the advantages of a simple structure and low costs. Using braking in an automobile as an example, according to researches, energy consumed in a braking process accounts for about 27.5% of the total traction energy of the automobile under ECE-15 condition, while under the US EPA 75 Urban condition and the Japan 1015 condition that are closer to the urban traveling condition, proportions of energy consumed in a braking process reaches about 48.3% and 53% respectively. Using a friction drum or disc brake (shown in FIG. 1) commonly used in automobiles as an example, energy consumed by braking is mainly dissipated in the form of frictional heat. When this part of energy can be recovered and utilized, it is very beneficial to improving the battery life and energy efficiency of the automobile.

The TENG may cause different materials to generate an electric charge in a contact friction manner due to triboelectric charging and then, cause a directional movement of the electric charge through electrostatic induction, thereby converting mechanical energy into electric energy. The TENG in an independent layer mode has higher mechanical energy-electric energy conversion efficiency, and can even reach 100% under ideal conditions. Therefore, the TENG may be combined with the brake, so that the relatively simple one-way rotational motion of brake may achieve relatively high energy conversion efficiency, and mechanical energy in a braking process can be fully converted into electric energy.

The embodiments of this application are further described below with reference to the accompanying drawings.

FIG. 1 shows a schematic diagram of example friction brakes in an automobile. Specifically, FIG. 1 shows a schematic diagram of a disc brake 101 and a drum brake 102.

As shown in FIG. 1, the disc brake 101 may include a brake pad 103 and a brake disc 104 arranged opposite to each other, and the drum brake 102 may include a brake pad 105 and a brake disc 106 arranged opposite to each other. Both the disc brake 101 and the drum brake 102 can utilize contact friction of their respective brake pads and brake discs to implement braking and deceleration. In a scenario of the disc brake 101, the brake disc 104 in a shape of a disc ring may rotate with a wheel. The brake pads 103 in a shape of a partial ring sheet on two sides of the brake disc 104 may come into contact with the brake disc 104 under the driving and control of the system, to generate friction in a radial direction of the wheel. The disc brake 101 has advantages such as good heat dissipation, rapid response, and good constancy. In a scenario of the drum brake 102, the drum brake 102 may rotate with a wheel as a whole. The brake disc 106 in an annular cylinder shape thereof is coaxial with the wheel, and the brake pad 105 in a shape of a partial cylinder shape on an inner side thereof may come into contact with the brake disc 106 under the driving and control of the system, to generate friction in an axial direction of the wheel. The drum brake 102 has advantages such as low costs, a large contact area, and a high absolute braking force. By taking a structure of the brake into full consideration, the TENG is integrated and combined with the brake to a high extent, and further, an energy recovery circuit based on a mechanical switch on the brake is utilized, to convert mechanical energy converted into electric energy while braking and decelerating, to recover energy for use of a brake warning light or another in-vehicle device. In addition, a running status of brake (for example, whether the brake is braking) may further be detected according to an output signal of the TENG. Implementation of this application is illustrated below in detail by using the disc brake 101 in the automobile as an example.

Figure 2:
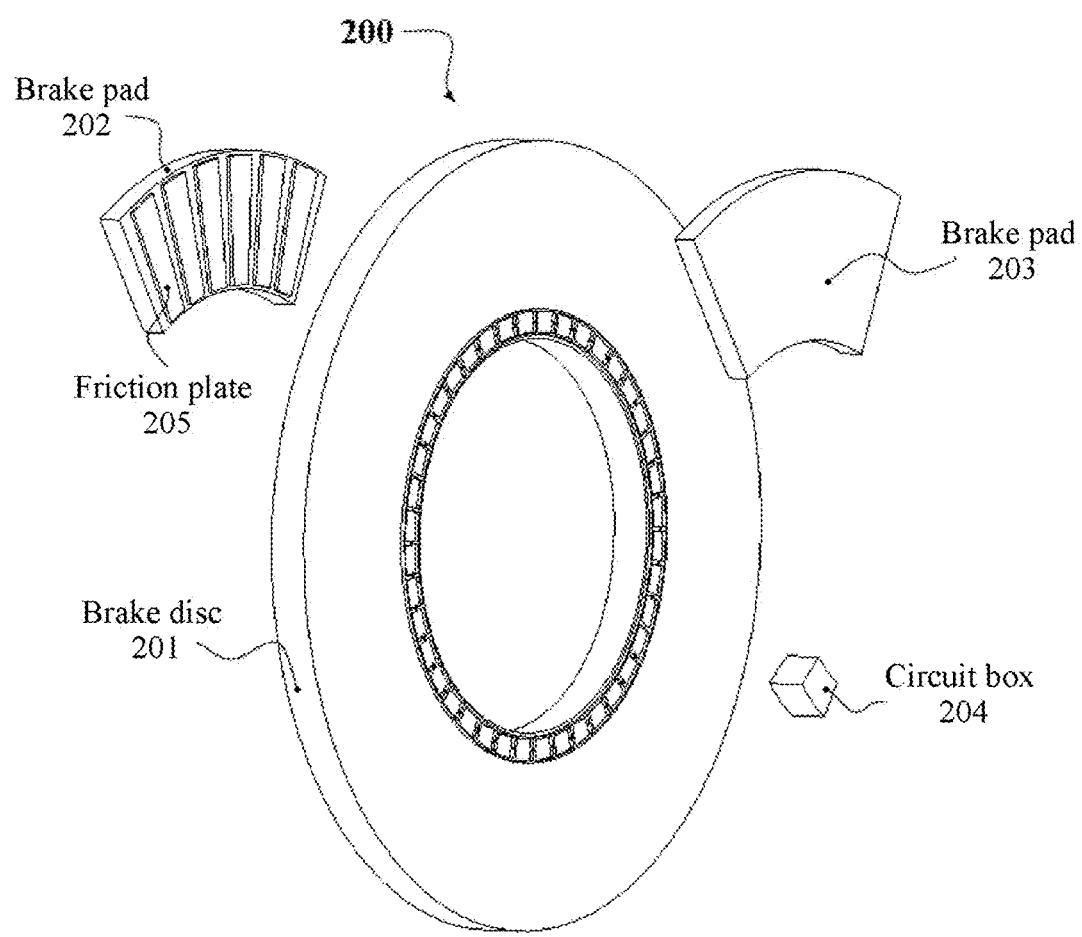
FIG. 2 shows an external structure of an example triboelectric generation apparatus based on a disc brake according to an embodiment of this application.

FIG. 2 shows an example external structure of a triboelectric generation apparatus based on a disc brake according to an embodiment of this application, and FIG. 3a and FIG. 3b respectively show an example three-dimensional view and an example side view of a triboelectric generation apparatus based on a disc brake according to an embodiment of this application in a braking state.

As shown in FIG. 2, a triboelectric generation apparatus 200 based on a disc brake may be combined with the structure of the disc brake 101 shown in FIG. 1 to a high extent. For example, an external structure of the triboelectric generation apparatus 200 may be substantially the same as the external structure of the disc brake 101 shown in FIG. 1. In the embodiment shown in FIG. 2, the disc brake may include a first friction component (for example, a brake disc 201) and a second friction component (for example, a brake pad 202 and/or a brake pad 203) arranged opposite to each other. As shown in FIG. 2, the first friction component, for example, the brake disc 201, may be in a shape of a disc ring. The second friction component, for example, the brake pad 202 and the brake pad 203 may be in a shape of a partial ring sheet. In a non-braking state, the brake pad 202 and the brake pad 203 located on two sides of the brake disc 201 may not be in contact with the brake disc 201, and the brake disc 201 may rotate with a wheel. In a braking state, as shown in FIG. 3a and FIG. 3b, the brake pad 202 and the brake pad 203 located on the two sides of brake disc 201 may come into contact with the brake disc 201 under the driving and control of the system, so that the brake disc 201 can generate contact friction relative to the brake pad 202 and the brake pad 203 and generate a friction braking force, to implement braking and deceleration. In addition, because of the triboelectric charging effect, when the brake disc 201 generates contact friction relative to the brake pad 202 and the brake pad 203, different electric charges may be generated on surfaces of the brake disc and the brake pads respectively.

In some embodiments, a friction plate 205 is arranged on an inner side of the second friction component (for example, the brake pad 202 and the brake pad 203), the inner side of the second friction component being a side of the second friction component opposite to the first friction component (for example, the brake disc 201). A friction material of the first friction component has a first electric polarity, and a friction material of the friction plate 205 on the second friction component has a second electric polarity different from the first electric polarity. For example, the second electric polarity may be opposite to the first electric polarity. For example, different materials with opposite polarities in a triboelectric polarity sequence list or with a relatively large position gap in the list may be selected as a friction material of the first friction component and a material of the friction plate 205 respectively. In this way, a larger triboelectric charging quantity may be caused.

FIG. 2, FIG. 3a, and FIG. 3b merely show an example structure in which two brake pads are respectively located on opposite sides of the brake disc 201. It is to be understood that in another embodiment, the brake may include one or more brake pads located on one or both sides of the brake disc 201, which is not limited herein.

In some embodiments, the triboelectric generation apparatus 200 based on a disc brake may include: a first sensing electrode and a second sensing electrode arranged in the first friction component. As stated above, because when the first friction component (for example, the brake disc 201) generates contact friction relative to the second friction component (for example, the brake pad 202 and the brake pad 203), the first friction component and the second friction component may generate friction electric charges with different polarities on friction surfaces thereof due to triboelectric charging, due to electrostatic induction, a first induced electric charge may be further generated on the first sensing electrode, and a second induced electric charge may be generated on the second sensing electrode. The first induced electric charge is different from the second induced electric charge. For example, the first induced electric charge nay be a positive electric charge, and the second induced electric charge may be a negative electric charge, or vice versa. In another example, for example, the first induced electric charge and the second induced electric charge may be different quantities of electric charges with the same polarity. An example triboelectric charging process and an example electrostatic induction process are described below in detail with reference to FIG. 9a and FIG. 9b.

In some embodiments, the triboelectric generation apparatus 200 may further include an electric charge collection circuit (which, for example, is included in a circuit box 204 shown in FIG. 2), which may be connected to the first sensing electrode and the second sensing electrode respectively, and store the electric charges collected from the first sensing electrode and the second sensing electrode, for use by a load.

In some embodiments, the triboelectric generation apparatus 200 may further include: a reed switch arranged in the second friction component. In addition, the electric charge collection circuit may store the electric charges collected from the first sensing electrode and the second sensing electrode under the control of the reed switch. An example structure of the triboelectric generation apparatus 200 according to an embodiment of this application is described below in detail with reference to FIG. 4a to FIG. 8.

Figure 4A:
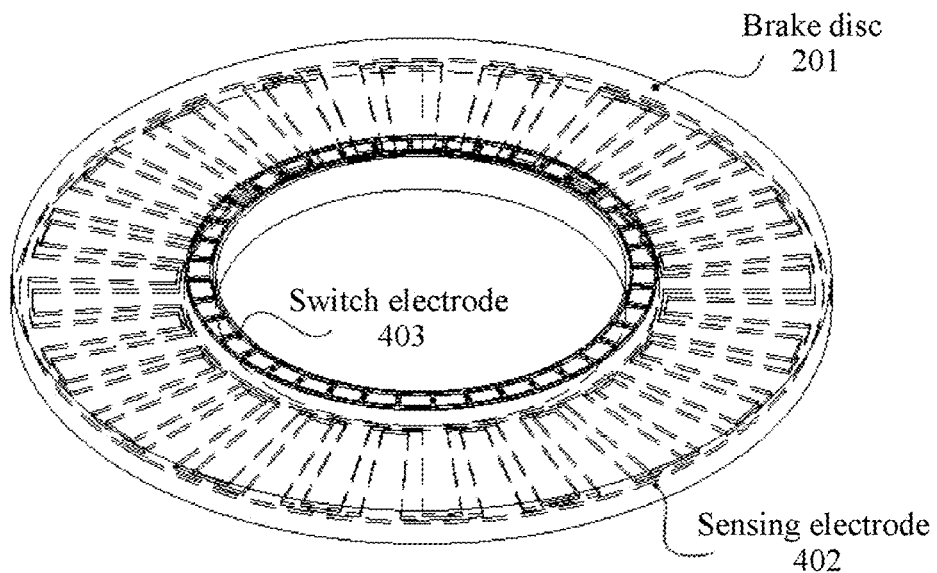
FIG. 4a and FIG. 4b respectively show a perspective view and a cross-sectional view of an example structure of a brake disc of a triboelectric generation apparatus according to an embodiment of this application.
Figure 4B:
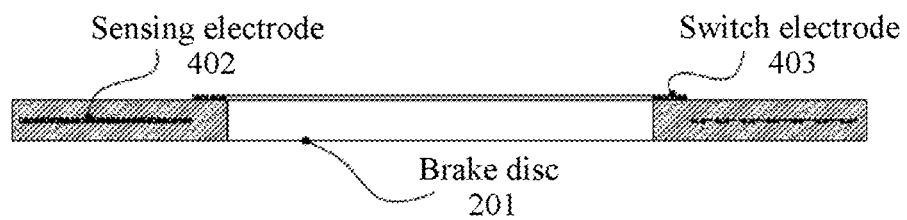

FIG. 4a and FIG. 4b respectively show a perspective view and a cross-sectional view of an example structure of a brake disc of a triboelectric generation apparatus according to an embodiment of this application.

Figure 5A:
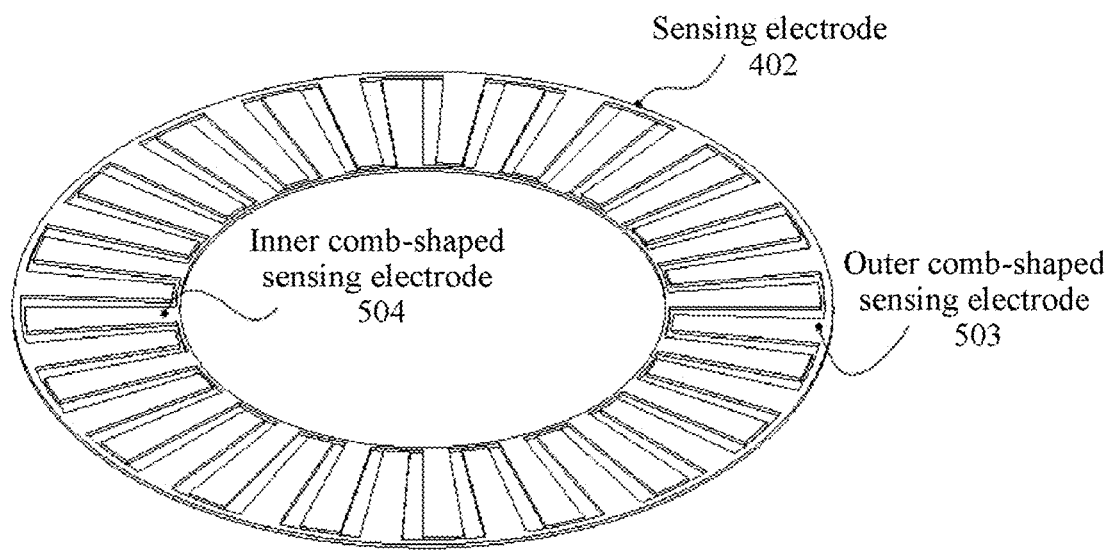
FIG. 5a, FIG. 5b, and FIG. 5c show detailed views of an example sensing electrode of a triboelectric generation apparatus according to an embodiment of this application.
Figure 5B:
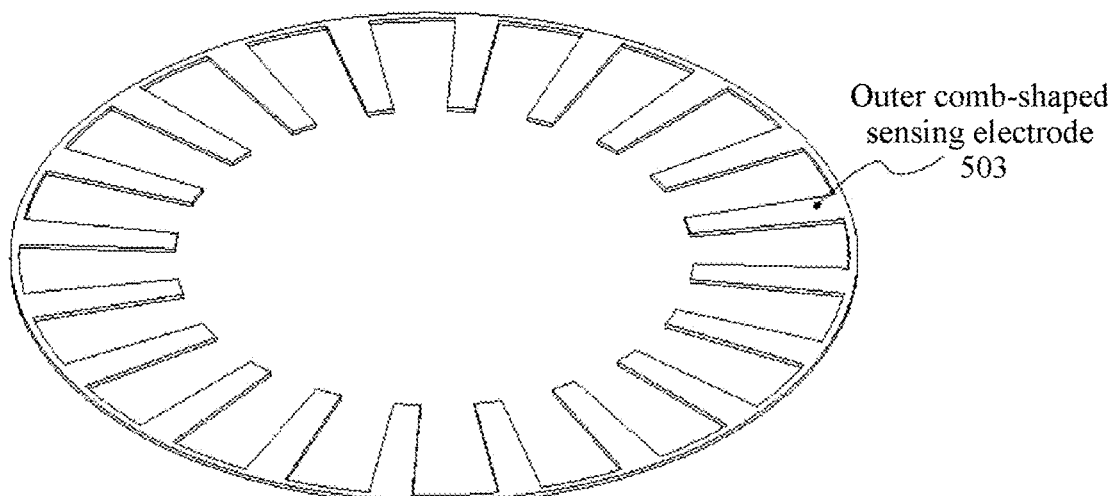
Figure 5C:
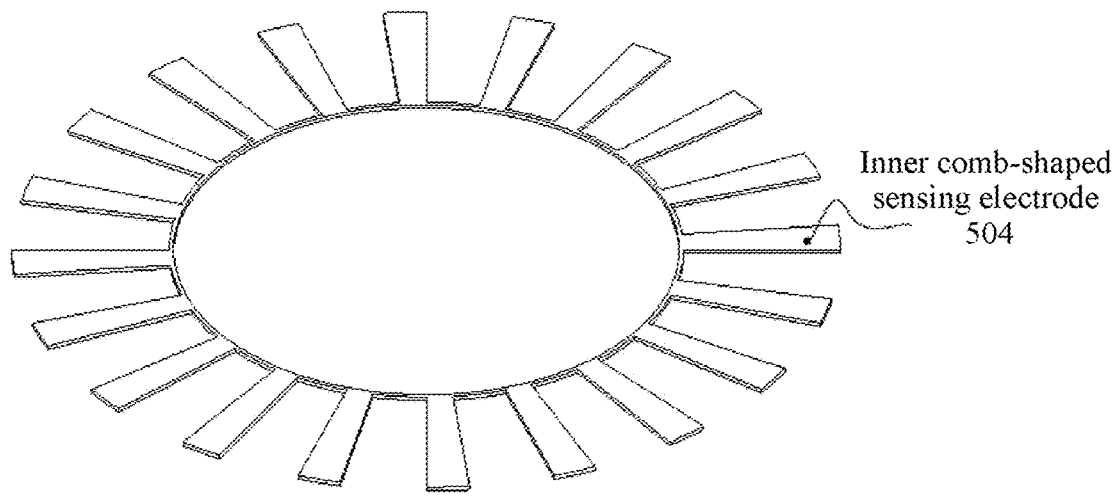

As shown in FIG. 4a, the triboelectric generation apparatus 200 may include a sensing electrode 402 arranged in the first friction component (for example, the brake disc 201). FIG. 5a, FIG. 5b, and FIG. 5c show example structures of a sensing electrode of a triboelectric generation apparatus according to an embodiment of this application. In some embodiments, as shown in FIG. 5a, the sensing electrode 402 may include a first sensing electrode (for example, an outer comb-shaped sensing electrode 503) and a second sensing electrode (for example, an inner comb-shaped sensing electrode 504). As shown in FIG. 5a to FIG. 5c, based on the disc ring structure of the brake disc 201, the outer comb-shaped sensing electrode 503 and the inner comb-shaped sensing electrode 504 may be annular comb-shaped conductor. Comb teeth of the outer comb-shaped sensing electrode 503 and comb teeth of the inner comb-shaped sensing electrode 504 may be arranged crosswise. In addition, there is no contact but a first gap between the outer comb-shaped sensing electrode 503 and the inner comb-shaped sensing electrode 504. In some embodiments, the comb teeth of the outer comb-shaped sensing electrode 503 and the comb teeth of the inner comb-shaped sensing electrode 504 may be distributed at equal distances. In some embodiments, the outer comb-shaped sensing electrode 503 and the inner comb-shaped sensing electrode 504 may have a same quantity of comb teeth and may have a same comb tooth width and a same radial length respectively. The quantities of the comb teeth and comb tooth shapes of the outer comb-shaped sensing electrode 503 and the inner comb-shaped sensing electrode 504 may be different according to a size and a shape of the brake disc 201. In some embodiments, the outer comb-shaped sensing electrode 503 and the inner comb-shaped sensing electrode 504 may be made of a conductor with excellent electrical conductivity such as copper, nickel, gold, silver, aluminum, or iron.

Figure 6A:
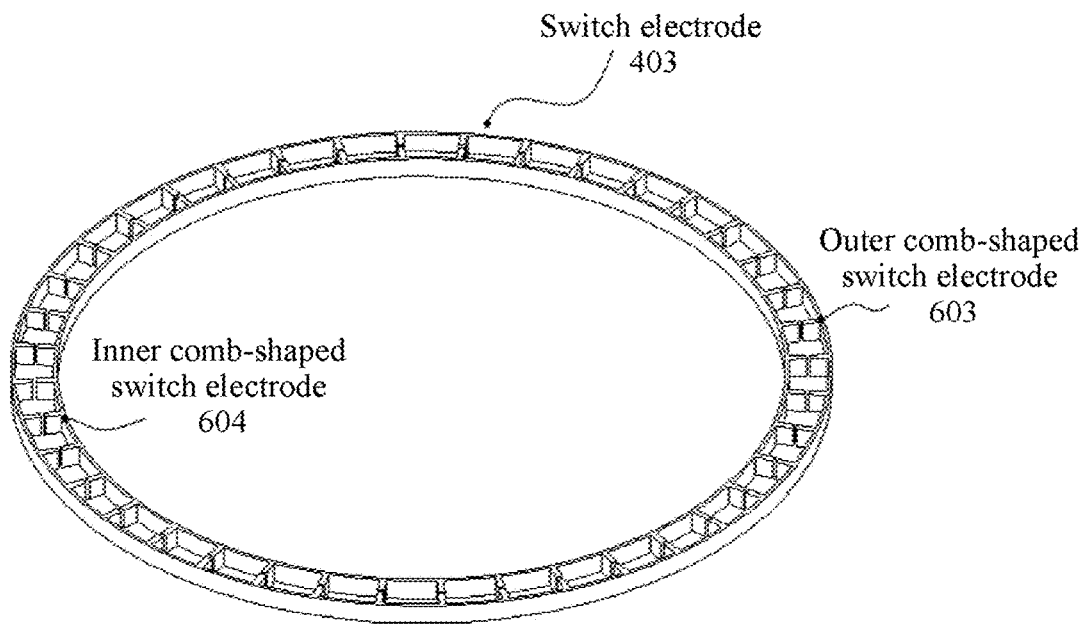
FIG. 6a, FIG. 6b and FIG. 6c show detailed views of an example switch electrode of a triboelectric generation apparatus according to an embodiment of this application.
Figure 6B:
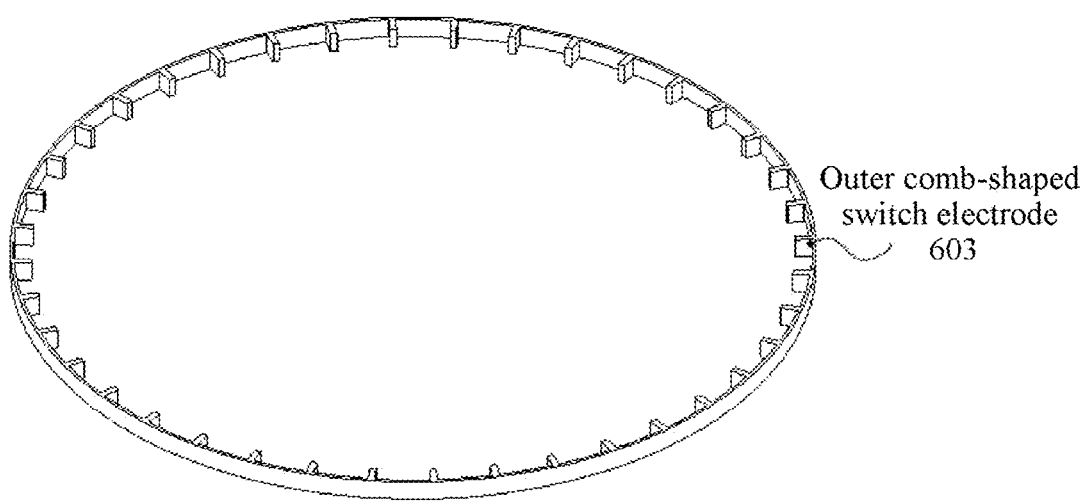
Figure 6C:
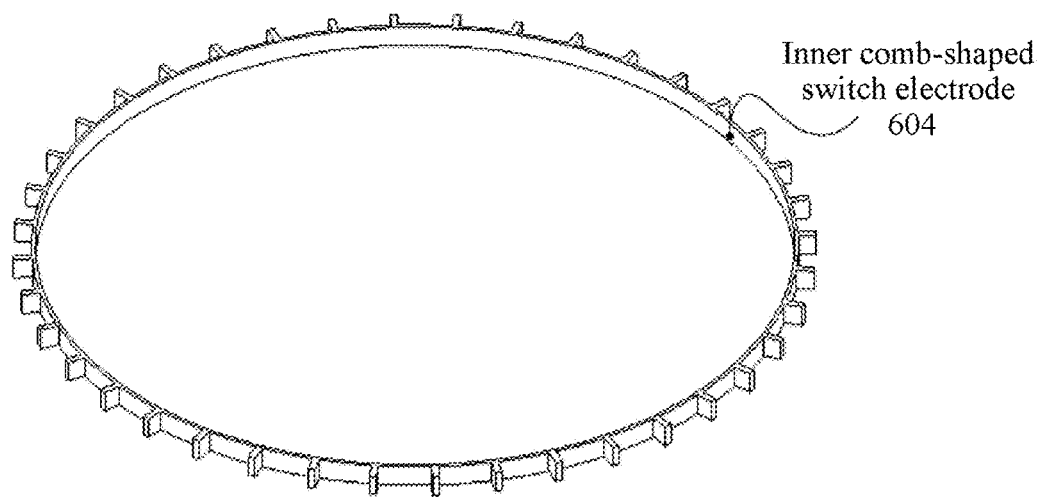

In some embodiments, as shown in FIG. 4a, the triboelectric generation apparatus 200 may include a switch electrode 403 arranged in the first friction component (for example, the brake disc 201). For example, as shown in FIG. 4a, based on the disc ring structure of the brake disc 201, the switch electrode 403 may be arranged on an inner circle of the brake disc 201. In another embodiment, the switch electrode 403 may also be arranged on an outer circle (not shown) of the brake disc 201. FIG. 6a, FIG. 6b and FIG. 6c show example structures of a switch electrode of a triboelectric generation apparatus according to an embodiment of this application. In some embodiments, as shown in FIG. 6a, the switch electrode 403 may include a first switch electrode and a second switch electrode. For example, as shown in FIG. 6a, the first switch electrode may be an annular outer comb-shaped switch electrode 603, and the second switch electrode may be an annular inner comb-shaped switch electrode 604; or the first switch electrode may be an annular inner comb-shaped switch electrode 604, and the second switch electrode may be an annular outer comb-shaped switch electrode 603. As shown in FIG. 6a to FIG. 6c, the outer comb-shaped switch electrode 603 and the inner comb-shaped switch electrode 604 may be annular comb-shaped conductors. Both a quantity of comb teeth of the outer comb-shaped switch electrode 603 and a quantity of comb teeth of the inner comb-shaped switch electrode 604 may be a first quantity, and the comb teeth of the outer comb-shaped switch electrode 603 and the comb teeth of the inner comb-shaped switch electrode 604 may be arranged opposite to form a first quantity of comb tooth pairs, and there is no contact but a second gap between oppositely arranged comb teeth in each comb tooth pair. As shown in FIG. 6a, the outer comb-shaped switch electrode 603 and the inner comb-shaped switch electrode 604 that are arranged opposite to each other form a trapezoidal ring. In some embodiments, the comb teeth of the outer comb-shaped switch electrode 603 and the comb teeth of the inner comb-shaped switch electrode 604 may be distributed at equal distances. In some embodiments, the outer comb-shaped switch electrode 603 and the inner comb-shaped switch electrode 604 may be made of a conductor material that is wear-resistant, has excellent electrical conductivity, and is environmentally friendly. In some embodiments, the foregoing reed switch arranged in the second friction component may be utilized to control a mechanical connection between the outer comb-shaped switch electrode 603 and the inner comb-shaped switch electrode 604, to control on or off of the circuit.

In some embodiments, both a quantity of the comb teeth of outer comb-shaped sensing electrode 503 and a quantity of the comb teeth of the inner comb-shaped sensing electrode 504 may be a second quantity. In addition, the first quantity of the comb teeth of the outer comb-shaped switch electrode 603 or the comb teeth of the inner comb-shaped switch electrode 604 may be two times the second quantity. For example, assuming that both a quantity of the comb teeth of outer comb-shaped sensing electrode 503 and a quantity of the comb teeth of the inner comb-shaped sensing electrode 504 are 25, a quantity of the comb teeth of the outer comb-shaped switch electrode 603 or the comb teeth of the inner comb-shaped switch electrode 604 may be 50. In this way, comb tooth pairs formed by opposite comb teeth of the outer comb-shaped switch electrode 603 and the inner comb-shaped switch electrode 604 have a one-to-one correspondence with the comb teeth of the outer comb-shaped sensing electrode 503 and the comb teeth of the inner comb-shaped sensing electrode 504.

In some embodiments, as shown in FIG. 4a, opposite comb teeth of the outer comb-shaped switch electrode 603 and the inner comb-shaped switch electrode 604 form a first quantity of comb tooth pairs. The first quantity of comb tooth pairs may have a one-to-one correspondence with the comb teeth of the outer comb-shaped sensing electrode 503 and the comb teeth of the inner comb-shaped sensing electrode 504. In addition, the comb tooth pairs of the outer comb-shaped switch electrode 603 and the inner comb-shaped switch electrode 604 may be located on edges of the comb teeth of the outer comb-shaped sensing electrode 503 and the inner comb-shaped sensing electrode 504 in a radial direction.

In another embodiment, a shape and a position of each corresponding comb tooth of the outer comb-shaped switch electrode 603 and the inner comb-shaped switch electrode 604, a shape and a position of an annular grid plates on the friction plate 205 described below, and a position of a reed switch on the brake pad 203 described below may be adaptively set according to shapes and positions of the comb teeth of the outer comb-shaped sensing electrode 503 and the inner comb-shaped sensing electrode 504, so that when the comb teeth of the outer comb-shaped sensing electrode 503 (or the comb teeth of the inner comb-shaped sensing electrode 504) just overlap the annular grid plates on the friction plate 205, the comb tooth pairs formed by opposite comb teeth of the outer comb-shaped switch electrode 603 and the inner comb-shaped switch electrode 604 come into contact with the reed switch on the brake pad 203 for switch-on. In this case, (that is, when the comb teeth of the outer comb-shaped sensing electrode 503 or the inner comb-shaped sensing electrode 504 just overlap the annular grid plates on the friction plate 205), an output voltage between the outer comb-shaped sensing electrode 503 and the inner comb-shaped sensing electrode 504 is the maximum. A principle is described below with reference to FIG. 9a and FIG. 9b.

Figure 7:
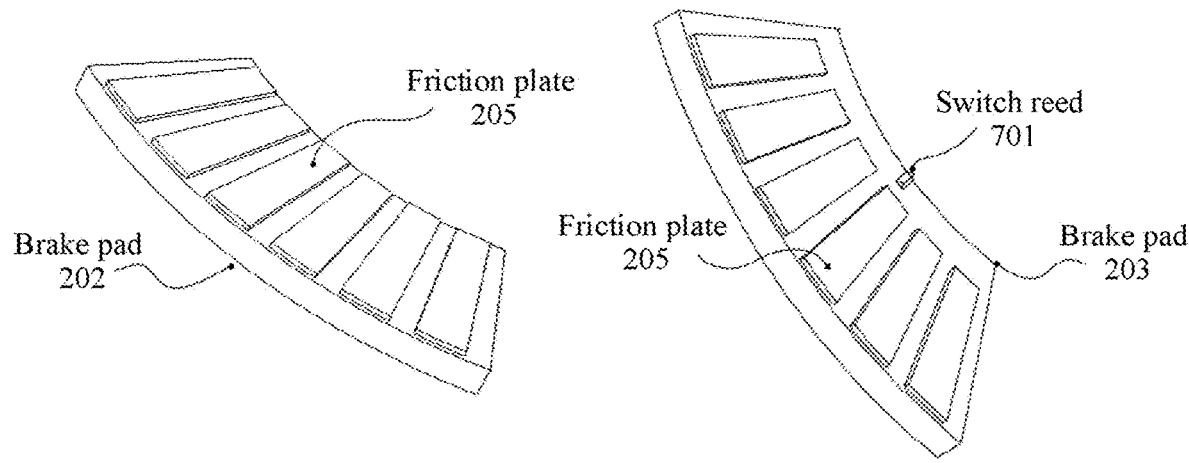
FIG. 7 shows an example brake pad of a triboelectric generation apparatus according to an embodiment of this application.

Subsequently, FIG. 7 shows an example structure of a brake pad of a triboelectric generation apparatus according to an embodiment of this application.

As shown in FIG. 7, in some embodiments, the second friction component (for example, the brake pad 202 and/or the brake pad 203) may be in a partial ring sheet. In some embodiments, as stated above, a friction plate 205 is arranged on an inner side of the second friction component (for example, the brake pad 202 and/or the brake pad 203), the inner side of the second friction component being a side of the second friction component opposite to the first friction component (for example, the brake disc 201). A friction material of the first friction component has a first electric polarity, and a friction material of the friction plate 205 on the second friction component has a second electric polarity different from the first electric polarity. For example, the second electric polarity may be opposite to the first electric polarity. In some embodiments, the disc ring of the first friction component may be coaxial with the partial ring sheet of the second friction component, and the first friction component may rotate around a center of the ring such that it may be in frictional contact with the friction plate 205 on the second friction component.

In some embodiments, as shown in FIG. 7, the friction plate 205 may include one or more annular grid plates. FIG. 7 shows an example in which the friction plate 205 includes a plurality of annular grid plates (for example, 6 annular grid plates). In another embodiment, according to different sizes of the brake pad and different comb tooth widths of comb-shaped sensing electrodes in the brake disc, the friction plate 205 may include different quantities of annular grid plates with different widths. Each annular grid plate in the plurality of annular grid plates may be radially arranged in an annular region corresponding to a region in which the comb teeth of the outer comb-shaped sensing electrode 503 intersect the comb teeth of the inner comb-shaped sensing electrode 504. The each annular grid plate in the plurality of annular grid plates has a comb tooth shape the same as that of the outer comb-shaped sensing electrode 503 or the inner comb-shaped sensing electrode 504. In some embodiments, there is a third gap between adjacent annular grid plates in the plurality of annular grid plates. In addition, the third gap may have a width the same as that of a gap between adjacent comb teeth of the outer comb-shaped sensing electrode 503 or a gap between adjacent comb teeth of the inner comb-shaped sensing electrode 504. Under such an arrangement, in a process in which the brake disc rotates relative to the brake pad, the plurality of annular grid plates on the friction plate 205 can completely overlap a corresponding quantity of successive comb teeth of the outer comb-shaped sensing electrode 503 or completely overlap a corresponding quantity of successive comb teeth of the inner comb-shaped sensing electrode 504.

In some embodiments, as shown in FIG. 7, the foregoing reed switch 701 may be located on an edge of the second friction component (for example, the brake pad 203) in a radial direction. The reed switch 701 may be wedge-shaped, and may be arranged parallel to the second gap. The second gap is a gap between a corresponding comb tooth pair of the outer comb-shaped switch electrode 603 or the inner comb-shaped switch electrode 604. In another embodiment, as stated above, a position of the reed switch 701 may also be determined according to shapes and positions of the comb teeth of the outer comb-shaped sensing electrode 503 and the inner comb-shaped sensing electrode 504, shapes and positions of the plurality of annular grid plates on the friction plate 205, and positions of corresponding comb tooth pairs of the outer comb-shaped switch electrode 603 and the inner comb-shaped switch electrode 604, so that when the comb teeth of the outer comb-shaped sensing electrode 503 (or the comb teeth of the inner comb-shaped sensing electrode 504) just overlap the plurality of annular grid plates on the friction plate 205, the corresponding comb tooth pairs of the outer comb-shaped switch electrode 603 and the inner comb-shaped switch electrode 604 come into contact with the reed switch on the brake pad 203 for switch-on. In this case, (that is, when the comb teeth of the outer comb-shaped sensing electrode 503 or the inner comb-shaped sensing electrode 504 just overlap the plurality of annular grid plates on the friction plate 205), an output voltage between the outer comb-shaped sensing electrode 503 and the inner comb-shaped sensing electrode 504 is the maximum. A principle is described below with reference to FIG. 9a and FIG. 9b.

It is to be understood, as shown in FIG. 7, when there are two or more brake pads, the reed switch 701 may be arranged on any one of the two or more brake pads.

In some embodiments, a radial width of the reed switch 701 may be greater than a width of the second gap and less than a sum of a radial width of the outer comb-shaped switch electrode 603, a radial width of the inner comb-shaped switch electrode 604, and the width of the second gap therebetween. Under such an arrangement, when the reed switch 701 comes into contact with the outer comb-shaped switch electrode 603 and the inner comb-shaped switch electrode 604, the outer comb-shaped switch electrode 603 and the inner comb-shaped switch electrode 604 are switched on, and the reed switch 701 does not generate contact friction with another, undesired position on the triboelectric generation apparatus 200.

The ladder-shaped switch electrode 403 integrated on the brake disc 201 and the reed switch 701 integrated on the brake pad 203 constitute a mechanical contact switch. As stated above, under such an arrangement, when an output voltage between the first sensing electrode and the second sensing electrode is the maximum, the switch electrode 403 is switched on to output an electric charge, and in the remaining time, the switch electrode 403 is switched off and does not output an electric charge to the electric charge collection circuit. Such a ladder-shaped mechanical contact switch integrated on the brake can improve the stability and accuracy of the switch.

Figure 8:
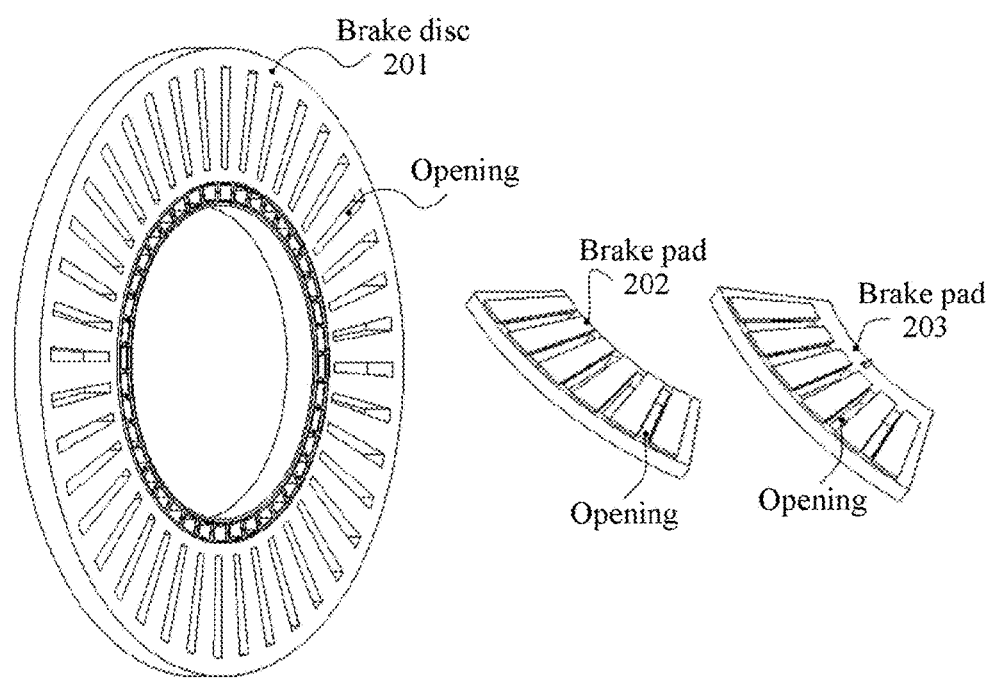
FIG. 8 shows an example opening structure of a triboelectric generation apparatus according to an embodiment of this application.

In addition, FIG. 8 shows an opening structure of the triboelectric generation apparatus 200 according to an embodiment of this application. As shown in FIG. 8, an opening can be provided at a position of the first friction component (for example, the brake disc 201) corresponding to the first gap, and an opening can be provided at a position of the second friction component (for example, the brake pad 202 and the brake pad 203) corresponding to the third gap. The first gap is a gap between the outer comb-shaped sensing electrode and the inner comb-shaped sensing electrode, and the third gap is a gap between the plurality of annular grid plates. Such an arrangement may lead to better drainage or a better heat dissipation effect in the braking process, and prolong the service life of the triboelectric generation apparatus 200.

A triboelectric charging process and an electrostatic induction process of the triboelectric generation apparatus 200 based on some configurations in the foregoing embodiments are described below with reference to FIG. 9a and FIG. 9b.

Figure 9A:
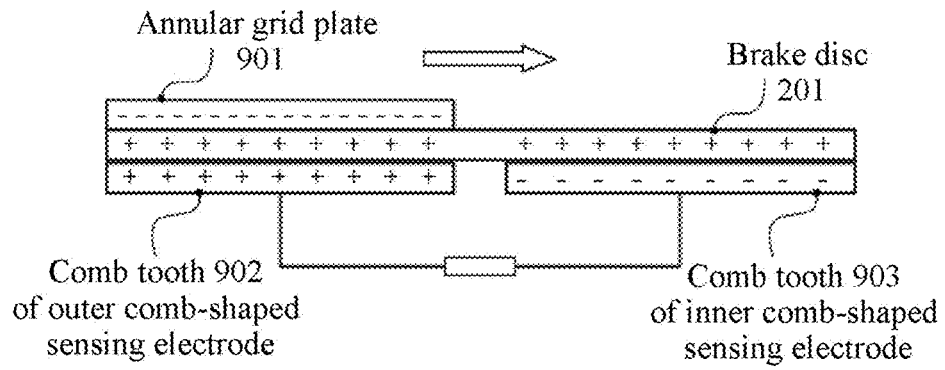
FIG. 9a and FIG. 9b show an example triboelectric charging process and an electrostatic induction process of a triboelectric generation apparatus according to an embodiment of this application.
Figure 9B:
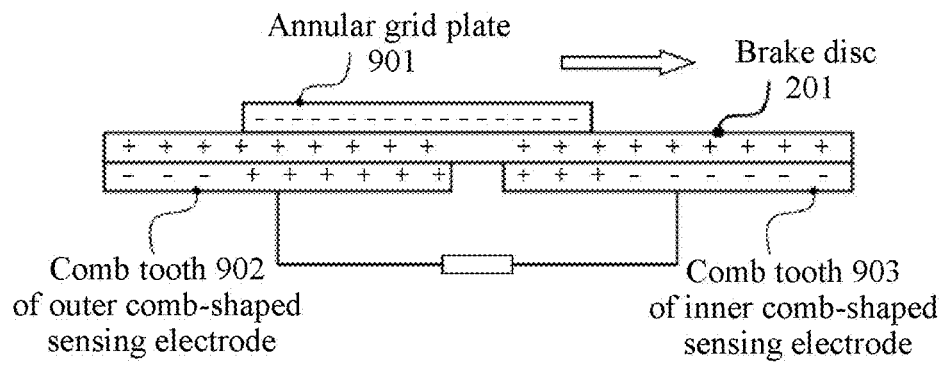

FIG. 9a and FIG. 9b show a triboelectric charging process and an electrostatic induction process of the triboelectric generation apparatus 200 according to an embodiment of this application. To simplify the description, the figures merely show an annular grid plate 901 on the friction plate 205 and a pair of adjacent comb teeth of the outer comb-shaped sensing electrode sensing electrode 503 and the inner comb-shaped sensing electrode sensing 504 (that is, a comb tooth 902 of the outer comb-shaped sensing electrode sensing electrode and a comb tooth 903 of the inner comb-shaped sensing electrode).

As shown in FIG. 9a, assuming that in a braking process, the annular grid plate 901 frictionally slides from left to right relative to the brake disc 201 as indicated by an arrow direction in the figure, and assuming that a friction material of the annular grid plate 901 has a frictional negative polarity, and a friction material of the brake disc 201 has a frictional positive polarity, then in the braking process, due to the triboelectric effect, a frictional surface of the annular grid plate 901 may generate a negative electric charge, and a friction surface of the brake disc 201 may generate a positive electric charge. Assuming that a density of positive electric charges generated by the friction material of the brake disc 201 due to triboelectric charging is lower than a density of negative electric charges on the annular grid plate 901, at relative positions shown in FIG. 9a, due to electrostatic induction, positive electric charges with a specific density are induced on the comb tooth 902 of the outer comb-shaped sensing electrode, and negative electric charges with a specific density are induced on the comb tooth 903 of the inner comb-shaped sensing electrode due to the positive electric charges on the brake disc 201.

After the annular grid plate 901 frictionally slides to the right relative to the brake disc 201 by a distance, as shown in FIG. 9b, a left part of the comb tooth 902 of the outer comb-shaped sensing electrode that does not overlap the annular grid plate 901 is no longer affected by the negative electric charges on the annular grid plate 901, and induces negative electric charges with a specific density under the impact of the positive electric charges generated by the friction of brake disc 201. A right part of the comb tooth 902 of the outer comb-shaped sensing electrode that overlaps the annular grid plate 901 is continuously affected by the negative electric charges on the annular grid plate 901, and induces positive electric charges. At the same time, a left part of the comb tooth 903 of the inner comb-shaped sensing electrode that overlaps the annular grid plate 901 is affected by the negative electric charges on the annular grid plate 901, and induces positive electric charges with a specific density.

Therefore, when the annular grid plate 901 frictionally slides from a position completely overlapping the comb tooth 902 of the outer comb-shaped sensing electrode (as shown in FIG. 9a) to a position completely overlapping the comb tooth 903 of the inner comb-shaped sensing electrode, due to electrostatic induction, positive electric charges are transferred from the comb tooth 902 of the outer comb-shaped sensing electrode to the comb tooth 903 of the inner comb-shaped sensing electrode. Similarly, when the annular grid plate 901 continues to frictionally slide from the position completely overlapping the comb tooth 903 of the inner comb-shaped sensing electrode to a position completely overlapping a next comb tooth of the outer comb-shaped sensing electrode (not shown), positive electric charges are transferred from the comb tooth 903 of the inner comb-shaped sensing electrode to the next comb tooth of the outer comb-shaped sensing electrode. Through such alternation, the positive electric charges are mutually transferred between the outer comb-shaped sensing electrode 503 and the inner comb-shaped sensing electrode 504. When the comb tooth 902 of the outer comb-shaped sensing electrode and the comb tooth 903 of the inner comb-shaped sensing electrode are used as two poles of a power supply, power can be supplied to an external load.

In some embodiments, as stated above, an electric charge collection circuit electrically connected to the outer comb-shaped sensing electrode 503 and the inner comb-shaped sensing electrode 504 respectively may be utilized to collect and store electric charges from the outer comb-shaped sensing electrode 503 and the inner comb-shaped sensing electrode 504.

Figure 10:
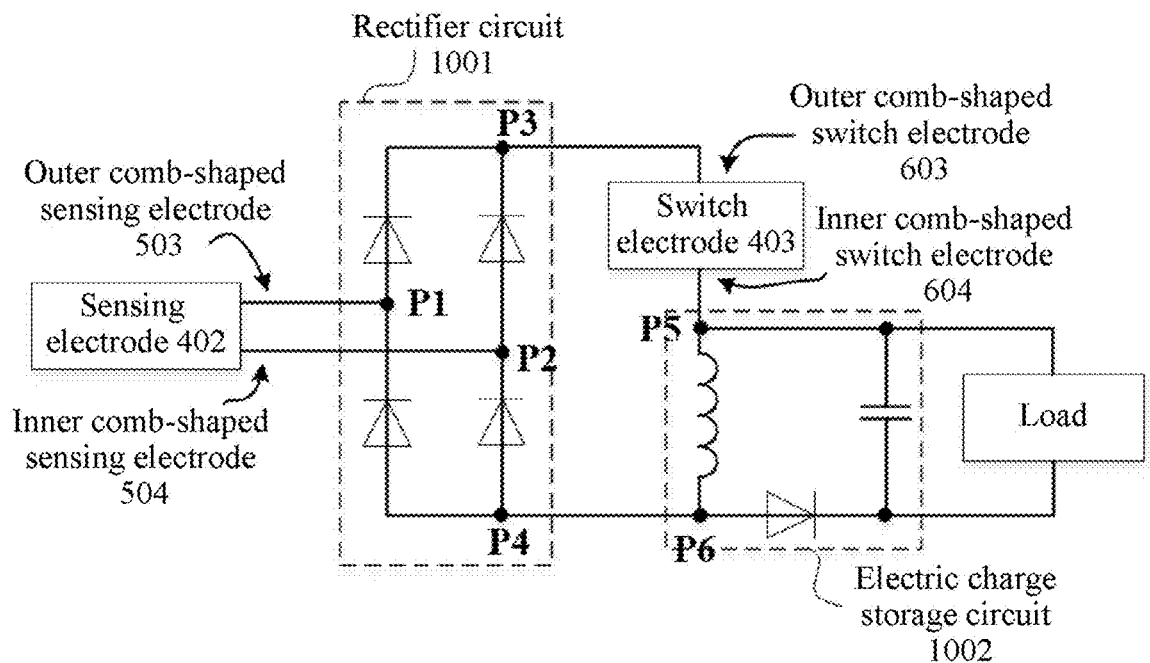
FIG. 10 shows an example schematic circuit diagram of an electric charge collection circuit of a triboelectric generation apparatus according to an embodiment of this application.

FIG. 10 shows a schematic circuit diagram of an electric charge collection circuit of a triboelectric generation apparatus according to an embodiment of this application.

As shown in FIG. 10, in some embodiments, the electric charge collection circuit may include a rectifier circuit 1001 and an electric charge storage circuit 1002.

The rectifier circuit 1001 can be a rectifier bridge circuit including a plurality of diodes. A first input terminal P1 of the rectifier circuit 1001 may be connected to the first sensing electrode (for example, the outer comb-shaped sensing electrode 503), and a second input terminal P2 of the rectifier circuit 1001 may be connected to the second sensing electrode (for example, the inner comb-shaped sensing electrode 504), and a first output terminal P3 of the rectifier circuit 1001 may be connected to the first switch electrode (for example, the outer comb-shaped switch electrode 603).

The electric charge storage circuit 1002 may include devices such as a capacitor, an inductor, and a diode. As shown in FIG. 10, a first input terminal P5 of the electric charge storage circuit 1002 may be connected to the second switch electrode (for example, the inner comb-shaped switch electrode 604), and a second input terminal P6 of the electric charge storage circuit 1002 may be connected to a second output terminal P4 of the rectifier circuit 1001.

As stated above, the first switch electrode (for example, the outer comb-shaped switch electrode 603) and the second switch electrode (for example, the inner comb-shaped switch electrode 604) may switch on or off under the control of the reed switch, positions of the comb teeth of the switch electrodes and a position of the reed switch may be adjusted to switch on the circuit when the output voltage between the first sensing electrode and the second sensing electrode is the maximum. When the first switch electrode is connected to (switches on) the second switch electrode by the reed switch, the electric charge storage circuit 1002 stores the electric charges collected from the first sensing electrode and the second sensing electrode into the inductor and/or the capacitor for subsequent use of a load. By using the mechanical contact switch that integrates the electric charge collection circuit and the brake to a high extent, the circuit is switched on and collects and stores electric charges when the output voltage between the first sensing electrode and the second sensing electrode is the maximum, so that the high-impedance triboelectric generation apparatus can be impedance-decoupled from a load circuit, which improves the efficiency of the circuit under different loads.

Figure 11:
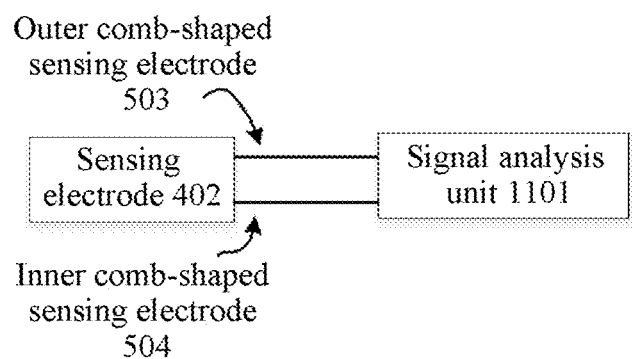
FIG. 11 shows an example schematic diagram of an output of a sensing electrode according to an embodiment of this application for monitoring and analysis.

In addition, the output of the sensing electrode may also be used as a monitoring signal for monitoring a status of the brake. FIG. 11 shows a schematic diagram of an output of a sensing electrode according to an embodiment of this application for monitoring and analysis. As shown in FIG. 11, an output of the sensing electrode 402 (for example, the outer comb-shaped sensing electrode 503 and the inner comb-shaped sensing electrode 504) may be directly connected to a signal analysis unit 1101 for status analysis of the brake. For example, whether the brake is currently braking or the like may be determined depending on whether an included voltage is detected on the output of the sensing electrode 402.

Figure 12A:
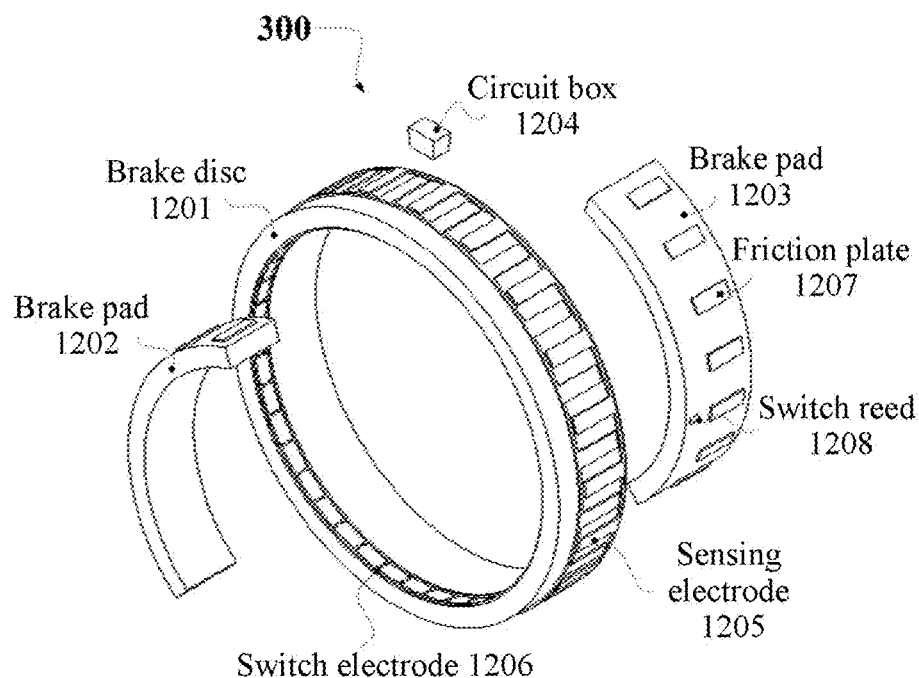
FIG. 12a and FIG. 12b show example external structures of a triboelectric generation apparatus based on a drum brake according to an embodiment of this application.
Figure 12B:
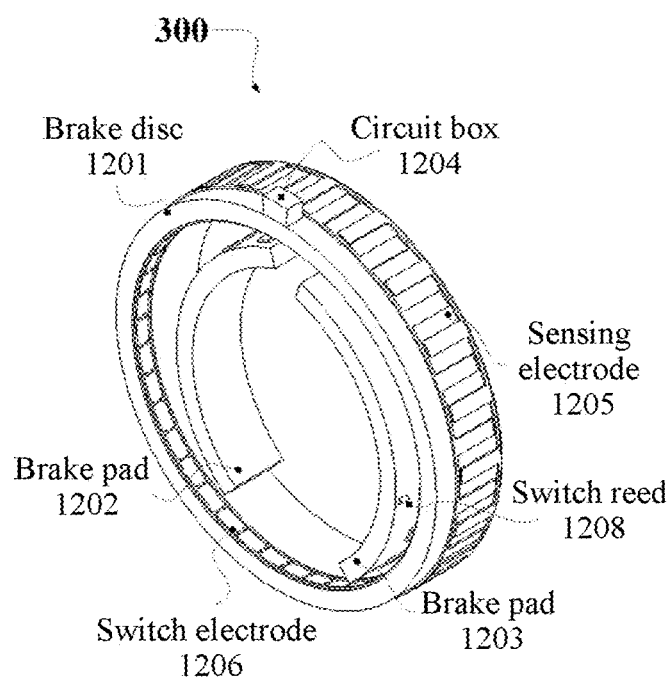

In addition, FIG. 12a and FIG. 12b show example external structures of a triboelectric generation apparatus based on a drum brake according to an embodiment of this application.

FIG. 12a and FIG. 12b respectively show schematic structural diagrams of components of a triboelectric generation apparatus 300 based on a drum brake when being dispersed and combined. As shown in FIG. 12b, the triboelectric generation apparatus 300 based on a drum brake may be combined with the structure of the drum brake 102 shown in FIG. 1 to a high extent. For example, an external structure of the triboelectric generation apparatus 300 may be substantially the same as the external structure of the drum brake 102 shown in FIG. 1.

In the embodiment shown in FIG. 12b, the drum brake may include a first friction component (for example, a brake disc 1201) and a second friction component (for example, a brake pad 1202 and/or a brake pad 1203) arranged opposite to each other. As shown in FIG. 12a or FIG. 12b, the brake disc 1201 may be in a shape of an annular cylinder, and the brake pad 1202 and the brake pad 1203 may be in a shape of a partial annular cylinder. The brake disc 1201 may be coaxial with the brake pad 1202 and the brake pad 1203, and the brake pad 1202 and the brake pad 1203 may be located on an inner side of the annular cylinder of the brake disc 1201. A sensing electrode 1205 (for example, including the first sensing electrode and the second sensing electrode that are comb-shaped and that are arranged crosswise) may be arranged on a surface of an outer circle of or inside the brake disc 1201. A switch electrode 1206 (for example, including the first switch electrode and the second switch electrode that are comb-shaped and that are arranged opposite to each other) may be arranged on a surface of an inner circle of the brake disc 1201. A grid-shaped friction plate 1207 may be arranged on outer surfaces of the brake pad 1202 and the brake pad 1203 that can come into contact with the brake disc 1201. In addition, a reed switch 1208 may also be arranged on one of the brake pad 1202 and the brake pad 1203 (for example, the brake pad 1203). Similar to the triboelectric generation apparatus 200 based on a disc brake, the electric charge collection circuit may also be integrated in a circuit box 1204.

Figure 13A:
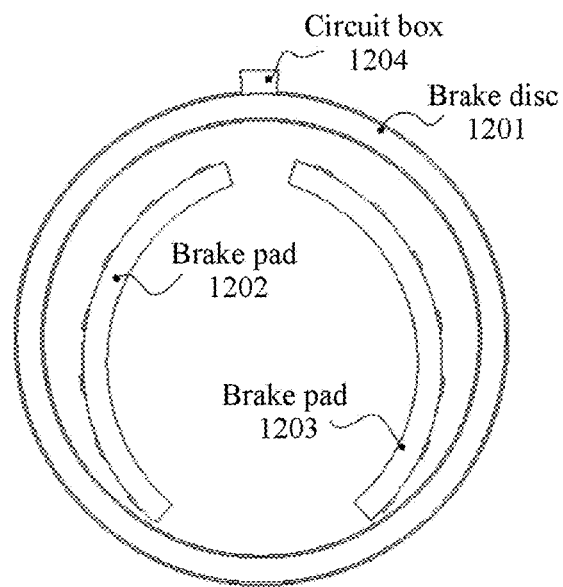
FIG. 13a and FIG. 13b respectively show side views of an example triboelectric generation apparatus based on a drum brake according to an embodiment of this application in a non-braking state and a braking state.
Figure 13B:
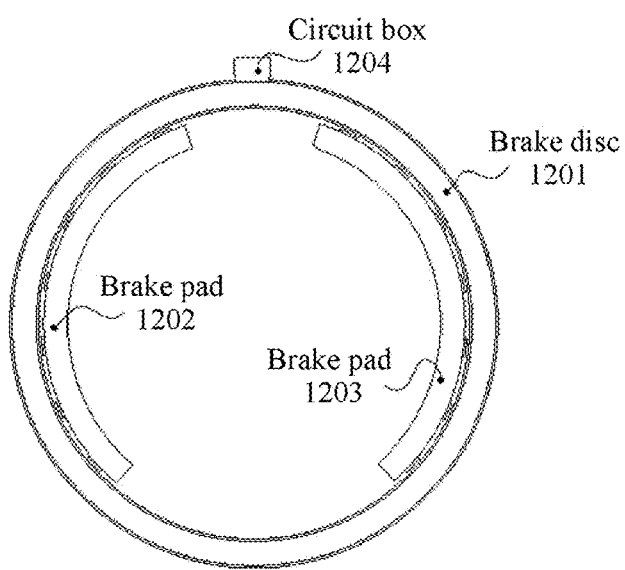

FIG. 13a and FIG. 13b respectively show side views of a triboelectric generation apparatus based on a drum brake according to an embodiment of this application in a non-braking state and a braking state.

As shown in FIG. 13a, in a non-braking state, the brake pad 1202 and the brake pad 1203 located on an inner side of the brake disc 1201 may not be in contact with the brake disc 1201, and the brake disc 1201 may rotate with a wheel. In a braking state, as shown in FIG. 13b, the brake pad 1202 and the brake pad 1203 located on the inner side of brake disc 1201 may come into contact with the brake disc 1201 under the driving and control of the system, so that the brake disc 1201 can generate contact friction relative to the brake pad 1202 and the brake pad 1203 and generate a friction braking force, to implement braking and deceleration. In a braking state, the first sensing electrode and the second sensing electrode of the sensing electrode 1205 can induce induced electric charges, and when the reed switch 1208 on the brake pad 1203 switches on the switch electrode 1206 (that is, the first switch electrode and the second switch electrode switch on), the electric charges on the sensing electrode 1205 can be collected and stored to the circuit box 1204 for subsequent use of a load. An example implementation of the triboelectric generation apparatus 300 based on a drum brake is similar to the triboelectric generation apparatus 200 based on a disc brake according to the foregoing.

The embodiments of this application further provide a friction brake, including: a brake disc and a brake pad arranged opposite to each other, the brake disc generating a friction braking force and generating an electric charge in response to generating contact friction relative to the brake pad; and the brake further including a triboelectric generation apparatus. The triboelectric generation apparatus may include: a first sensing electrode and a second sensing electrode arranged in the brake disc. When the brake disc generates contact friction relative to the brake pad, a first induced electric charge may be generated on the first sensing electrode, and a second induced electric charge may be generated on the second sensing electrode, the first induced electric charge being different from the second induced electric charge. The triboelectric generation apparatus may further include an electric charge collection circuit, connected to the first sensing electrode and the second sensing electrode respectively, and configured to store the electric charges collected from the first sensing electrode and the second sensing electrode.

There may be one or more brake pads arranged opposite to the brake disc, and a quantity of the brake pads is not limited in this embodiment.

In some embodiments, a friction plate may be arranged on an inner side of the brake pad. The inner side of the brake pad may be a side of the brake pad opposite to the brake disc. In some embodiments, a friction material of the brake disc may have a first electric polarity, and a friction material of the friction plate on the brake pad may have a second electric polarity different from the first electric polarity. For example, the first electric polarity is opposite to the second electric polarity.

In some embodiments, the friction brake may be a disc brake. The brake disc may be a disc ring, the brake pad may be a partial annular sheet, the brake disc and the brake pad may be coaxial, and the brake pad may be located on one or both sides of the brake disc.

In some embodiments, the friction brake may be a drum brake. The brake disc may be an annular cylinder, the brake pad may be a partial annular cylinder, the brake disc and the brake pad may be coaxial, and the brake pad may be located on an inner side of the brake disc.

Various structures of the friction brake and the triboelectric generation apparatus may be similar to the example structures of the triboelectric generation apparatus 200 and the triboelectric generation apparatus 300 according to the foregoing embodiments of this application, and details are not described herein again.

The triboelectric generation apparatus provided in this application combines a triboelectric nanogenerator with a friction brake to a high extent by taking the structure of the friction brake into full consideration, which simplifies the structure and improves the reliability; uses a synchronous electric charge extraction circuit, to decouple the impedance of the triboelectric nanogenerator and a load circuit, and improve the performance of the circuit under different loads; and integrates a ladder-shaped mechanical contact switch on the brake, to improve the stability and precision of a circuit switch.

The example embodiments of this application that are described above in detail are merely illustrative instead of limitative. A person skilled in the art is to understand that various modifications and combinations may be made to these embodiments or the features thereof without departing from the principles and spirit of this application, and such modifications shall fall within the scope of this application.

What is claimed is:

1. A triboelectric generation apparatus based on a friction brake, the triboelectric generation apparatus comprising:
    a first sensing electrode and a second sensing electrode arranged in a first friction component of the friction brake, wherein when the first friction component is in frictional contact with a second friction component of the friction brake, a first induced electric charge is generated on the first sensing electrode, and a second induced electric charge is generated on the second sensing electrode;
    an electric charge collection circuit electrically connected to the first sensing electrode and the second sensing electrode, configured to store the first induced electric charge and the second induced electric charge, wherein the first induced electric charge is different from the second induced electric charge; and
    a reed switch arranged in the second friction component, the reed switch configured to control the electric charge collection circuit.

2. The triboelectric generation apparatus according to claim 1, further comprising a first switch electrode and a second switch electrode arranged in the first friction component, the reed switch further configured to control an electrical connection between the first switch electrode and the second switch electrode, the electric charge collection circuit comprising:
    a rectifier circuit comprising a first rectifier input terminal connected to the first sensing electrode, a second rectifier input terminal connected to the second sensing electrode, and a first rectifier output terminal connected to the first switch electrode; and
    an electric charge storage circuit, a first storage input terminal connected to the second switch electrode, and a second storage input terminal connected to a second rectifier output terminal, the electric charge storage circuit configured to store the induced electric charges when the reed switch electrically connects the first switch electrode to the second switch electrode.

3. The triboelectric generation apparatus according to claim 2, wherein:
    the first friction component is a disc ring,
    the first sensing electrode is an annular outer comb-shaped sensing electrode, and
    the second sensing electrode is an annular inner comb-shaped sensing electrode, wherein comb teeth of the outer comb-shaped sensing electrode and comb teeth of the inner comb-shaped sensing electrode are arranged crosswise, defining a first gap between the outer comb-shaped sensing electrode and the inner comb-shaped sensing electrode.

4. The triboelectric generation apparatus according to claim 3, wherein:
    the first switch electrode and the second switch electrode are arranged on an inner circle or an outer circle of the disc ring, the first switch electrode is an annular outer comb-shaped switch electrode, and the second switch electrode is an annular inner comb-shaped switch electrode,
    comb teeth of the outer comb-shaped switch electrode and comb teeth of the inner comb-shaped switch electrode are opposed to form a first quantity of comb tooth pairs and define a second gap between each comb tooth pair, and
    the reed switch is further configured to control a mechanical connection between the outer comb-shaped switch electrode and the inner comb-shaped switch electrode.

5. The triboelectric generation apparatus according to claim 4, wherein:
    a quantity of the comb teeth of the outer comb-shaped sensing electrode and a quantity of the comb teeth of the inner comb-shaped sensing electrode are a second quantity, the first quantity of comb tooth pairs being two times the second quantity,
    the outer comb-shaped sensing electrode and the inner comb-shaped sensing electrode having a same comb tooth width and a same radial length, and
    the first quantity of comb tooth pairs having a one-to-one correspondence with the second quantity.

6. The triboelectric generation apparatus according to claim 5, wherein:
    the second friction component is a partial ring, a friction plate being arranged on an inner side of the partial ring and opposite the first friction component, the first friction component configured to rotate around a center of the disc ring and produce frictional contact with the friction plate, a friction material of the first friction component having a first electric polarity, and a friction material of the friction plate having a second electric polarity, the first electric polarity being opposite of the second electric polarity;
    the friction plate comprises a plurality of annular grid plates, the plurality of annular grid plates radially arranged in an annular region corresponding to where the comb teeth of the outer comb-shaped sensing electrode intersect the comb teeth of the inner comb-shaped sensing electrode;
    the plurality of annular grid plates have a comb tooth shape identical to the outer comb-shaped sensing electrode or the inner comb-shaped sensing electrode; and
    between each adjacent annular grid plate of the plurality of annular grid plates defines a third gap, the third gap having a width the same as a gap between adjacent comb teeth of the outer comb-shaped sensing electrode.

7. The triboelectric generation apparatus according to claim 6, wherein
    the first friction component comprises an opening at a position corresponding to the first gap, and
    the partial ring comprises an opening at a position corresponding to the third gap.

8. The triboelectric generation apparatus according to claim 5, wherein:
the comb tooth pairs of the outer comb-shaped switch electrode and the inner comb-shaped switch electrode are located on radial edges of the comb teeth of the outer comb-shaped sensing electrode and the comb teeth of the inner comb-shaped sensing electrode; and
the reed switch is located on a radial edge of the second friction and is arranged parallel to the second gap, a radial width of the reed switch being greater than a width of the second gap, wherein the outer comb-shaped switch electrode and the inner comb-shaped switch electrode are configured to switch on when the reed switch is in contact with the outer comb-shaped switch electrode and the inner comb-shaped switch electrode.

9. The triboelectric generation apparatus according to claim 3, wherein the outer comb-shaped sensing electrode and the inner comb-shaped sensing electrode are made of at least one of copper, nickel, gold, silver, aluminum, and iron.

10. The triboelectric generation apparatus according to claim 1, wherein a friction plate is arranged on an inner side of the second friction component, the inner side of the second friction component opposite the first friction component, a friction material of the first friction component has a first electric polarity and a friction material of the friction plate has a second electric polarity, the first electric polarity being opposite the second electric polarity.

11. A friction brake, comprising:
a brake disc and a brake pad arranged opposite each other, the brake disc generating a friction braking force and generating an electric charge when in frictional contact with the brake pad; and
a triboelectric generation apparatus, the triboelectric generation apparatus comprising:
a first sensing electrode and a second sensing electrode arranged in the brake disc, wherein when the brake disc is in frictional contact with the brake pad, a first induced electric charge is generated on the first sensing electrode, and a second induced electric charge is generated on the second sensing electrode;
an electric charge collection circuit electrically connected to the first sensing electrode and the second sensing electrode, configured to store the first induced electric charge and the second induced electric charge, wherein the first induced electric charge is different from the second induced electric charge; and
a reed switch arranged in the brake pad, the reed switch configured to control the electric charge collection circuit.

12. The friction brake according to claim 11, further comprising a first switch electrode and a second switch electrode arranged in the brake disc, the reed switch further configured to control an electrical connection between the first switch electrode and the second switch electrode, the electric charge collection circuit comprising:
a rectifier circuit comprising a first rectifier input terminal connected to the first sensing electrode, a second rectifier input terminal connected to the second sensing electrode, and a first rectifier output terminal connected to the first switch electrode; and
an electric charge storage circuit, a first storage input terminal connected to the second switch electrode, and a second storage input terminal connected to a second rectifier output terminal, the electric charge storage circuit configured to store the induced electric charges when the reed switch electrically connects the first switch electrode to the second switch electrode.

13. The friction brake according to claim 12, wherein:
the brake disc is a disc ring,
the first sensing electrode is an annular outer comb-shaped electrode, and
the second sensing electrode is an annular inner comb-shaped sensing electrode, wherein comb teeth of the outer comb-shaped sensing electrode and comb teeth of the inner comb-shaped sensing electrode are arranged crosswise, defining a first gap between the outer comb-shaped sensing electrode and the inner comb-shaped sensing electrode.

14. The friction brake according to claim 13, wherein:
the first switch electrode and the second switch electrode are arranged on an inner circle or an outer circle of the disc ring, the first switch electrode is an annular outer comb-shaped switch electrode, and the second switch electrode is an annular inner comb-shaped switch electrode,
comb teeth of the outer comb-shaped switch electrode and comb teeth of the inner comb-shaped switch electrode are opposed to form a first quantity of comb tooth pairs, and define a second gap between each comb tooth pair, and
the reed switch is further configured to control a mechanical connection between the outer comb-shaped switch electrode and the inner comb-shaped switch electrode.

15. The friction brake according to claim 14, wherein:
a quantity of the comb teeth of the outer comb-shaped sensing electrode and a quantity of the comb teeth of the inner comb-shaped sensing electrode form are a second quantity of comb tooth pairs, the first quantity of comb tooth pairs being two times the second quantity of comb tooth pairs,
the outer comb-shaped sensing electrode and the inner comb-shaped sensing electrode having a same comb tooth width and a same radial length respectively, and
the first quantity of comb tooth pairs having a one-to-one correspondence with the second quantity of comb tooth pairs.

16. The friction brake according to claim 15, wherein:
the comb tooth pairs of the outer comb-shaped switch electrode and the inner comb-shaped switch electrode are located on radial edges of the comb teeth of the outer comb-shaped sensing electrode and the comb teeth of the inner comb-shaped sensing electrode; and
the reed switch is located on a radial edge of the second friction and is arranged parallel to the second gap, a radial width of the reed switch being greater than a width of the second gap, wherein the outer comb-shaped switch electrode and the inner comb-shaped switch electrode are configured to switch on when the reed switch is in contact with the outer comb-shaped switch electrode and the inner comb-shaped switch electrode.

17. The friction brake according to claim 15, wherein:
the second friction component is a partial ring, a friction plate being arranged on an inner side of the partial ring and opposite the first friction component, the first friction component configured to rotate around a center of the disc ring and produce frictional contact with the friction plate, a friction material of the first friction component having a first electric polarity, and a friction material of the friction plate having a second electric polarity, the first electric polarity being opposite of the second electric polarity;

the friction plate comprises a plurality of annular grid plates, the plurality of annular grid plates radially arranged in an annular region corresponding to where the comb teeth of the outer comb-shaped sensing electrode intersect the comb teeth of the inner comb-shaped sensing electrode;

the plurality of annular grid plates have a comb tooth shape identical to the outer comb-shaped sensing electrode or the inner comb-shaped sensing electrode; and between each adjacent annular grid plate of the plurality of annular grid plates defines a third gap, the third gap having a width the same as a gap between adjacent comb teeth of the outer comb-shaped sensing electrode.

18. The friction brake according to claim 11, wherein a friction plate is arranged on an inner side of the brake pad, the inner side of the brake pad opposite the brake disc, a friction material of the brake disc has a first electric polarity, and a friction material of the friction plate has a second electric polarity, the first electric polarity being opposite the second electric polarity.

19. The friction brake according to claim 11, wherein the friction brake is a disc brake, the brake disc is a disc ring, the brake pad is a partial annular sheet, the brake disc and the brake pad are coaxial, and the brake pad is located such that it can come in frictional contact with at least one side of the brake disc.

20. The friction brake according to claim 11, wherein the friction brake is a drum brake, the brake disc is an annular cylinder, the brake pad is a partial annular cylinder, the brake disc and the brake pad are coaxial, and the brake pad is located such that it can come in frictional contact on an inner side of the brake disc.

* * * * *

UNITED STATES PATENT AND TRADEMARK OFFICE
CERTIFICATE OF CORRECTION

PATENT NO. : 12,379,009 B2
APPLICATION NO. : 17/899249
DATED : August 5, 2025
INVENTOR(S) : Yuan Dai et al.

Page 1 of 1

It is certified that error appears in the above-identified patent and that said Letters Patent is hereby corrected as shown below:

In the Claims

Column 20, Claim 15, Line 32, delete "form".

Signed and Sealed this
Sixteenth Day of September, 2025

Coke Morgan Stewart
*Acting Director of the United States Patent and Trademark Office*